July 24, 1923.

A. W. REYNOLDS 1,463,138

CULTIVATOR

Filed July 12, 1921

INVENTOR.
ArthurW. Reynolds
BY
Chamberlain & Newman ATTORNEYS.

July 24, 1923.
A. W. REYNOLDS
CULTIVATOR
Filed July 12, 1921
1,463,138
2 Sheets-Sheet 2
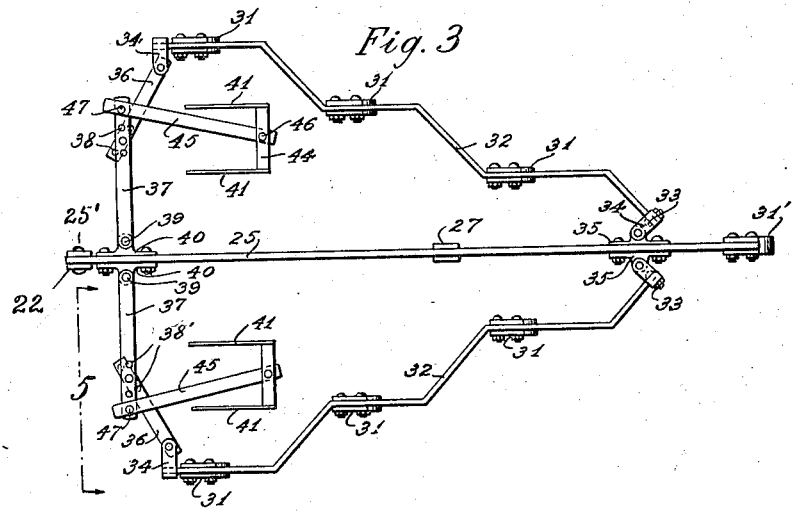
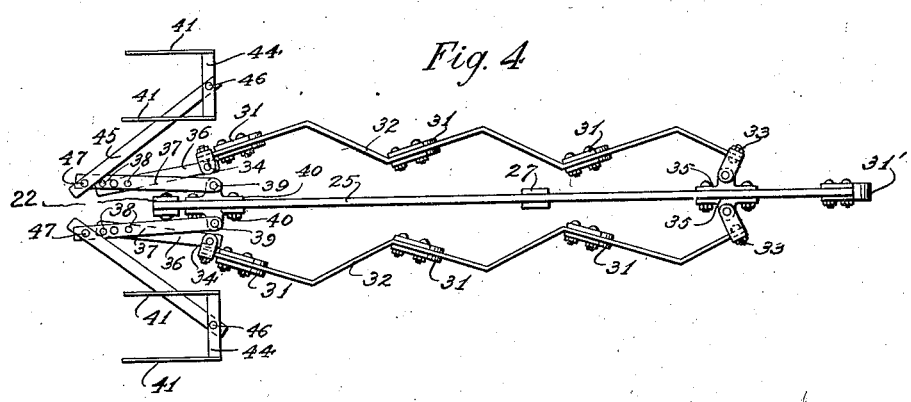
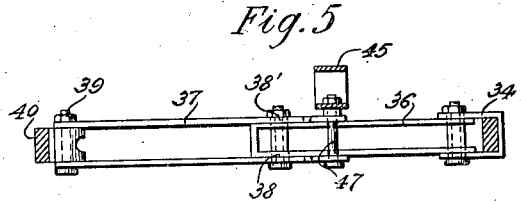
INVENTOR.
Arthur W. Reynolds
BY
Chamberlain & Newman ATTORNEYS.

Patented July 24, 1923.

1,463,138

UNITED STATES PATENT OFFICE.

ARTHUR W. REYNOLDS, OF NEWTOWN, CONNECTICUT.

CULTIVATOR.

Application filed July 12, 1921. Serial No. 484,042.

*To all whom it may concern:*

Be it known that ARTHUR W. REYNOLDS, a citizen of the United States, and resident of Newtown, in the county of Fairfield and State of Connecticut, has invented certain new and useful Improvements in Cultivators, of which the following is a specification.

This invention relates to new and useful improvements in cultivators, and has more especial reference to a simple and inexpensive commercial type of one-horse sulky or riding cultivator which may be drawn so that the teeth of the cultivator will follow the horse between two rows of plants, while the two wheels supporting the cultivator will run between the two adjoining rows.

The object of the invention is to incorporate in a cultivator of the character mentioned, means whereby the driver may independently move the two side gangs of cultivator teeth so as to avoid plowing out any plants and still closely follow the same on curves or narrow places between the rows of plants, which means shall be an improvement over that disclosed in my prior Patent No. 1,339,864, granted May 11, 1920, the gangs being normally set in the present cultivator, as well as in the cultivator of the patent just referred to, for cultivating the widest distance between rows and moved in by the operator when necessary.

With the above and other objects in view, the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and in which, Fig. 1 is a top plan view of a cultivator embodying my invention, the shafts being broken away;

Fig. 3 is a disconnected plan view of the gang of cultivator teeth, including the supporting frame for said teeth and certain associated parts, showing the two series of teeth set their widest distance apart;

Fig. 4 is also a plan view corresponding with Fig. 3, except that the two gangs of teeth are shown moved in toward each other; and Fig. 5 is a detail view, partially in section, of said certain associated parts as when seen from about the position denoted by the line 5 in Fig. 3.

Figure 1:
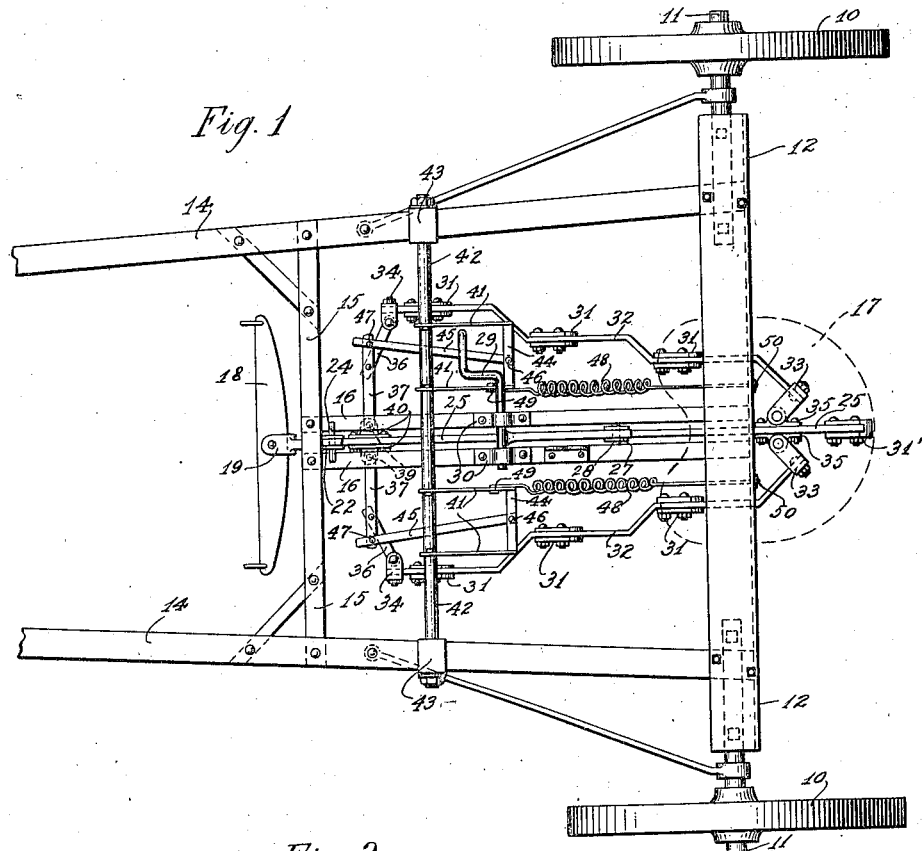

Referring in detail to the characters of reference marked upon the drawings, 10 represents the wheels of the cultivator and 11 the wheel spindles which are formed integral with the uprights 13 which support the cross beam 12. The pair of shafts are bolted to the cross beam 12 in the manner shown and are provided with a cross member 15 which is positioned parallel to and forward of the cross beam.

A pair of longitudinal beams 16 which are spaced apart and arranged parallel with each other forming the central part of the sulky frame, have their forward ends secured to the cross member 15 and their rear ends secured to the cross beam 12. These longitudinal beams serve as a part of the frame portion of the sulky and in part as a support for the gangs of cultivator teeth and mechanism for operating the same. As will be seen, the cultivator teeth, including the frame for carrying the same are arranged centrally between the two sulky wheels and flexibly hung from the longitudinal beams. 17 denotes a seat supported upon the rear ends of the longitudinal beams and naturally directly in line with the center of the shafts and above the gangs of cultivator teeth.

The whiffletree 18 to which the horse is attached is directly connected to the forward portion of the cultivator frame through the medium of a clevis 19 and bolt 20, which latter may be positioned in either of the holes 21 of the hanger 22. The upper portion of this hanger is preferably slidably mounted between the two longitudinal beams 16 and is provided with a series of holes 23 in either of which the pin 24 may be positioned. The end portions of the said pin rest upon the top of the longitudinal beams in a way to support the hanger and its cultivator frame at any desired height to regulate the depth of cultivation. A handle may be positioned upon the upper end portion of this hanger to permit the same to be readily raised or lowered for the purpose of shifting the position of the pin as will be understood.

The center bar 25 of the cultivator frame has its forward end rigidly supported between the lower portions of the hanger 22 as denoted at 25′ and brace 22′ and the rear portion of said center bar is pivotally attached, as denoted at 26, to an upwardly extending hanger member 27, the upper portion of which extends between the longitudinal beams 16 and is pivoted, as denoted at 28, to a bell crank lever 29 mounted in brackets 30 upon the longitudinal beams. Obviously, the mechanism just described provides for elevation of the rear portion of the center bar and consequently of the cultivator gangs.

Figure 2:
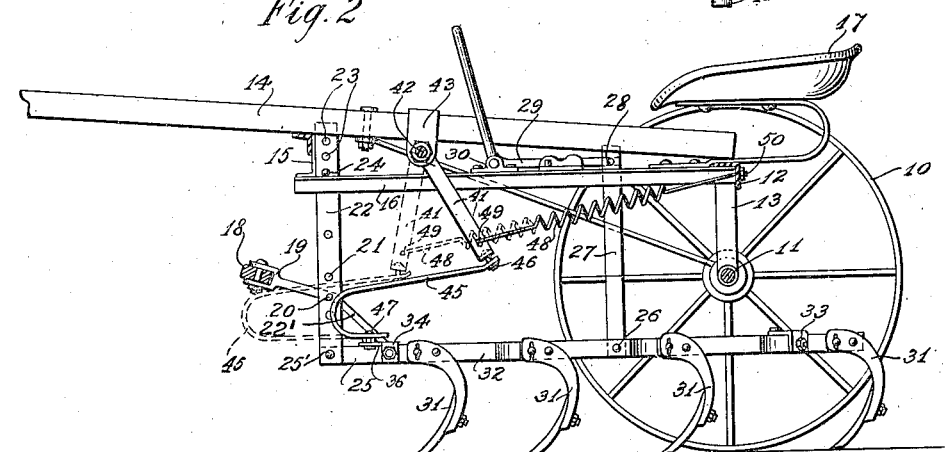
Fig. 2 is a longitudinal, vertical, sectional view of the cultivator shown in Fig. 1.

The cultivator teeth 31 are mounted in a frame which in addition to the center bar 25 (see Figs. 3, 4 and 5) includes two side members 32 that are each connected at their rear ends, as indicated at 33, to ears 34 themselves pivoted to brackets 35 upon the center bar 25. The cultivator tooth 31′ is secured to the rear end of the draw bar and in alignment therewith so as to normally operate centrally between two rows of plants. The two side bars 32 are alike in construction, except that one is a right and the other is a left, and each is provided with any desired number of cultivator teeth, three as shown, positioned so that they will not align with each other. The forward ends of the side bars 32 are each provided with inwardly projecting ears 34 to which links 36 are pivotally connected, the inner portions of said links being adjustably pivoted to the outer portions of levers 37, see the holes 38 and 38′ in the links 36 and 37, respectively, for this purpose, and the inner ends of the levers 37 are pivotally supported as indicated at 39, upon brackets 40 fixed to a forward portion of the center bars 25. U-shaped hanger 41 pivotally suspended to have forward and rearward oscillatory movement upon the cross rod 42 mounted in brackets 43 upon the shafts 14, from stirrups 44 to which push rods 45 are pivoted as denoted at 46 in a way to have horizontal sidewise movement, and said push rods 45 extend forwardly from said stirrups and have their forward curved ends pivotally connected to the outer ends of the levers 37, as denoted by bolts 47 which also act as stops to limit the action of the springs 48 and determine the positioning of the stirrups. Springs 48 having their forward ends secured in suitable fashion to the hanger strap 41 as denoted at 49 and their rear ends secured to the cross beam 12, as denoted at 50, normally hold the stirrups at their extreme rearward locations in convenient position to be engaged by the feet of the driver and allow the forward portions of the side bars 32 to be spaced their greatest distance apart (see Figs. 1, 2 and 3) as will be understood, this greatest distance being determined by the adjustment between the links 36 and 37. Obviously, when the stirrups are forced forwardly by the operator against the action of the springs 48, from the full line position in Fig. 2 to or toward the dotted line position therein, the side bars 32 will be swung inwardly a corresponding amount, from the position shown in Fig. 3 to or toward that shown in Fig. 4, and as soon as the stirrups are released the springs 48 will return the side bars 32 to their normal positions for cultivating the widest distance between rows. It is apparent that either side bar 32 can be swung inwardly independent of the other and that such manipulation and shifting of the gangs of teeth is for the purpose of better following the line of irregularly spaced rows, misplaced hills, stone or other obstructions that are situated close to the rows.

Having thus described the invention, what I claim and desire to secure by Letters Patent is:—

1. In a sulky cultivator of the character described, a center bar, a side bar pivotally secured thereto and carrying cultivator teeth and means for swinging said side bar on its pivot toward or from said center bar, said means comprising links and levers pivotally connecting said side and center bar, a push rod for manipulating said parts, and a stirrup device movable in a direction in line with said center bar for operating said push rod.

2. In a sulky cultivator of the character described, a center bar, a side bar pivotally secured thereto and carrying cultivator teeth and means for swinging said side bar on its pivot toward or from said center bar, said means including a link pivoted to said side bar, a lever pivotally connected with said link, a push rod pivotally connected to one of said parts and a stirrup device for operating said push rod.

3. In a sulky cultivator of the character described, a center bar, a pair of diverging side bars hingedly carried by the rear portion thereof and located upon opposite sides of said center bar, each of said side bars carrying a plurality of non-aligning cultivating teeth, and independent means adapted to be individually controlled by the respective feet of the operator for swinging the forward portions of said respective side bars toward said center bar, individually at will.

4. In a sulky cultivator, of the character described, a center bar, a pair of side bars hingedly carried by the rear portion thereof and located upon opposite sides of said center bar, each of said side bars carrying a plurality of non-aligning cultivating teeth, links and levers pivotally connecting said side bars and center bar, manipulating devices for said parts whereby the forward portions of the side bars may be swung toward the center bar, and means for normally holding said members a predetermined distance from said center bar, said means including springs connected with the manipulating devices and with the sulky frame.

5. In a sulky cultivator of the character described, a bar, a side bar hingedly carried thereby, links and levers pivotally connecting said side bar and bar, a manipulating device for the side bar whereby the same may be swung toward the bar, and means for normally holding said side bar a predetermined distance from the bar, said means including a spring connected with the manipulating device and with the sulky frame.

Signed at Bridgeport, in the county of Fairfield and State of Connecticut, this 8th day of July, A. D., 1921.

ARTHUR W. REYNOLDS

Witnesses:
C. M. NEWMAN,
LILLIAN M. ALLING.